(12) United States Patent
Chayama et al.

(10) Patent No.: US 10,669,377 B2
(45) Date of Patent: Jun. 2, 2020

(54) POLYIMIDE SOLUTION, HEAT-RESISTANT NON-WOVEN FABRIC, AND METHOD FOR MANUFACTURING SAME

(71) Applicant: TORAY INDUSTRIES, INC., Tokyo (JP)

(72) Inventors: Natsuko Chayama, Otsu (JP); Masao Tomikawa, Otsu (JP); Tomoyuki Yuba, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 25 days.

(21) Appl. No.: 15/517,783

(22) PCT Filed: Oct. 2, 2015

(86) PCT No.: PCT/JP2015/078028
§ 371 (c)(1),
(2) Date: Apr. 7, 2017

(87) PCT Pub. No.: WO2016/056480
PCT Pub. Date: Apr. 14, 2016

(65) Prior Publication Data
US 2017/0342214 A1    Nov. 30, 2017

(30) Foreign Application Priority Data
Oct. 10, 2014    (JP) .................. 2014-208592

(51) Int. Cl.
| | |
|---|---|
| *C08G 73/10* | (2006.01) |
| *D04H 1/4326* | (2012.01) |
| *D04H 1/728* | (2012.01) |
| *D01F 6/74* | (2006.01) |
| *D01D 5/00* | (2006.01) |
| *D01D 1/02* | (2006.01) |
| *H01M 2/14* | (2006.01) |
| *H01M 2/16* | (2006.01) |
| *C08L 79/08* | (2006.01) |

(52) U.S. Cl.
CPC ..... *C08G 73/1075* (2013.01); *C08G 73/1039* (2013.01); *C08G 73/1042* (2013.01); *C08G 73/1071* (2013.01); *C08L 79/08* (2013.01); *D01D 1/02* (2013.01); *D01D 5/003* (2013.01); *D01F 6/74* (2013.01); *D04H 1/4326* (2013.01); *D04H 1/728* (2013.01); *H01M 2/145* (2013.01); *H01M 2/16* (2013.01); *H01M 2/162* (2013.01)

(58) Field of Classification Search
CPC ............ C08G 73/1071; C08G 18/6438; C08G 18/8067; C08G 73/1082; C08L 79/08; D04H 1/728; H01L 2924/07025
See application file for complete search history.

(56) References Cited

U.S. PATENT DOCUMENTS

| | | | |
|---|---|---|---|
| 2009/0286087 A1* | 11/2009 | Tanaka | C08G 59/4042 428/418 |
| 2010/0229517 A1* | 9/2010 | Fujihara | D01D 5/04 55/527 |
| 2010/0233619 A1* | 9/2010 | Tagami | C08L 83/10 430/270.1 |
| 2011/0213075 A1 | 9/2011 | Goshima et al. | |
| 2016/0300810 A1* | 10/2016 | Kanamori | H01L 21/6836 |

FOREIGN PATENT DOCUMENTS

| | | | |
|---|---|---|---|
| JP | 61-141732 A | | 6/1986 |
| JP | 09-078031 | * | 3/1997 |
| JP | 9-78031 A | | 3/1997 |
| JP | 2001-206948 A | | 7/2001 |
| JP | 2002-3715 A | | 1/2002 |
| JP | 2011-132651 | * | 7/2011 |
| JP | 2011-132651 A | | 7/2011 |

(Continued)

OTHER PUBLICATIONS

Cheng et al (Preparation of nonwoven polyimide/silica hybrid nanofiberous fabrics by combining electrospinning and controlled in situ sol-gel techniques. European Polymer Journal 45 (2009) 2767-2778), Sep. 2009.*

(Continued)

*Primary Examiner* — Gregory Listvoyb
(74) *Attorney, Agent, or Firm* — Birch, Stewart, Kolasch & Birch, LLP

(57) ABSTRACT

The present invention provides a polyimide solution which does not require a ring-closing process at a high temperature for obtaining a heat-resistant polyimide non-woven fabric and which is hardly affected by atmosphere humidity in fiber production by electrospinning, so that a fiber with a stable diameter can be obtained in any circumstance.

A polyimide solution including: (a) a resin containing 50 mol % or more, based on the total amount of the resin, of a structural unit represented by the general formula (1); and (b) a solvent.

[Chemical Formula 1]

(1)

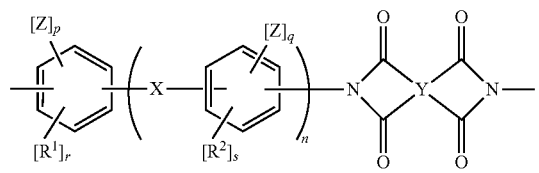

1 Claim, No Drawings

(56) References Cited

FOREIGN PATENT DOCUMENTS

| JP | 2011-140563 A | | 7/2011 |
|----|---------------|---|--------|
| JP | 2011132651 | * | 7/2011 |
| JP | 2011-178855 A | | 9/2011 |
| JP | 2013-91885 A | | 5/2013 |
| JP | 2014-111723 A | | 6/2014 |

OTHER PUBLICATIONS

Huang et al (Polyimide-Silica Hybrid Films Made from Polyamic Acids Containing Phenolic Hydroxyl Groups, Journal of Applied Polymer Science, vol. 93, 1198-1202 (Nov. 2004).*
International Search Report, issued in PCT/JP2015/078028, PCT/ISA/210, dated Jan. 12, 2016.
Written Opinion of the International Searching Authority, issued in PCT/JP2015/078028, PCT/ISA/237, dated Jan. 12, 2016.

* cited by examiner

POLYIMIDE SOLUTION, HEAT-RESISTANT NON-WOVEN FABRIC, AND METHOD FOR MANUFACTURING SAME

TECHNICAL FIELD

The present invention relates to a heat-resistant non-woven fabric which can be used in base materials for low dielectric constant substrates, acoustic materials for aircrafts etc., electromagnetic shielding materials, separation filters, heat-resistant bag filters, electrodes and separators for Li-ion secondary batteries, and electrodes and separators for electric double layer capacitors, and a method for manufacturing the heat-resistant non-woven fabric. More particularly, the present invention relates to a non-woven fabric which is hardly affected by humidity during fiber production and which has excellent thermal resistance, and a method for manufacturing the non-woven fabric.

BACKGROUND ART

In recent years, electronic devices have been required to have a low dielectric constant, and accordingly, heat-resistant materials with voids have been required. As a base material for these heat-resistant materials, a heat-resistant non-woven fabric capable of bearing a solder connecting process is one of promising candidates. The heat-resistant non-woven fabric receives attention as a material which exhibits excellent ion permeability and high mechanical strength and thermal resistance when subjected to metal plating. Specific applications include lightweight and excellent electromagnetic shielding materials, lightweight high-capacity electrode materials for Li-ion secondary batteries and electric double layer capacitors, heat-resistant bag filters for removing dust existing in combustion gases discharged from factories etc., gas separation membranes and water separation membranes, and separators for Li-ion secondary batteries and electric double layer capacitors.

Aircrafts etc. have increasingly required heat insulation acoustic materials with a large number of voids, which have high reliability in high-temperature and low-temperature environments.

Patent Document 1 discloses a polyimide composition having a specific structure suitable for electrospinning (ESP) for bag filters to be used at a high temperature, and a method for manufacturing a non-woven fabric.

Patent Document 2 discloses that a polyimide solution is discharged from a nozzle, a fast air flow crossing the polyimide solution is applied to the polyimide solution to obtain a polyimide fiber, and the polyimide fiber is used to obtain a heat-resistant bag filter, a heat insulation acoustic material, a heat-resistant wear and so on.

Patent Document 3 discloses a separator for Li-ion secondary batteries, which is obtained using a resin solution of a polyamic acid reacted with an epoxy group-containing alkoxy silane partial condensation product.

Patent Document 4 discloses a separator obtained by applying a highly branched polymer to a porous structural material such as a non-woven fabric.

Patent Document 5 discloses a non-woven fabric composed of polyimide short fibers, which is obtained by beating a foam obtained using a polyimide having a specific structure.

Patent Document 6 discloses that when a separator obtained by laminating a porous film and a non-woven fabric is used in a Li-ion secondary battery, an electrolyte absorption rate is increased, and the separator exhibits high insulation properties.

Patent Document 7 discloses a uniform and porous electrode separator for capacitors, which is obtained using an aliphatic polyketone non-woven fabric and which is thin and tough, and has excellent thermal resistance, dimension stability, electric insulation properties, chemical resistance and low-water absorbency, the separator being suitable for production of a capacitor having a high energy density and a low internal resistance.

Patent Document 8 discloses a high-performance lipophobic polyimide membrane obtained by electrospinning a polyimide fiber with a diameter of 10 nm to 50 μm to form a non-woven fabric composed of a plurality of polyimide fibers, and treating the non-woven fabric with a perfluoro polymer.

Patent Document 9 discloses that a solution of a polyimide having a specific structure is used to obtain nano-sized fine fibers by electrospinning.

Patent Document 10 discloses that an assembly including polyimide fibers is used in a Li-ion battery separator, a bag filter or a fuel exhaust gas filter to attain both thermal resistance and solubility.

Patent Document 11 discloses that by using a polyamide-imide, a polyamide or a polyimide in a separator including a layer of organic fibers prepared by electrospinning (ESP), a decrease in capacity of a Li-ion battery can be suppressed.

PRIOR ART DOCUMENTS

Patent Documents

Patent Document 1: Japanese Patent Laid-open Publication No. 2011-132611 (claims)
Patent Document 2: Japanese Patent Laid-open Publication No. 2011-9769 (claims)
Patent Document 3: International Publication No. WO 2009/054349 (claims)
Patent Document 4: Japanese Patent Laid-open Publication No. 2012-134145 (claims)
Patent Document 5: International Publication No. WO 2011/074641
Patent Document 6: Japanese Patent Laid-open Publication No. 2011-210680
Patent Document 7: Japanese Patent Laid-open Publication No. 2006-351733
Patent Document 8: Japanese Patent Laid-open Publication No. 2013-217008
Patent Document 9: Japanese Patent Laid-open Publication No. 2011-132651
Patent Document 10: Japanese Patent Laid-open Publication No. 2015-74866
Patent Document 11: Japanese Patent Laid-open Publication No. 2014-41817

SUMMARY OF THE INVENTION

Problems to be Solved by the Invention

However, the polyimides disclosed in Patent Documents 1 and 10 and so on have a high water absorption ratio, and are significantly swollen by an electrolyte and water, thus causing the problem that the opening dimension of the resulting non-woven fabric easily changes. The spinning method disclosed in Patent Document 3 requires that a high-temperature air flow be always applied to a fiber, leading to an increase in energy consumption. The spinning method also has the problem that when the temperature of a nozzle increases, and thus a solvent is evaporated, clogging easily occurs.

An object of the present invention is to provide a polyimide resin composition which does not require a ring-closing process at a high temperature for obtaining a heat-resistant polyimide non-woven fabric and which is hardly affected by atmosphere humidity in fiber production by electrospinning, so that a fiber with a stable diameter can be obtained in any circumstance, a heat-resistant nonwoven-fabric obtained using the polyimide resin composition, and a method for manufacturing the heat-resistant non-woven fabric.

Solutions to the Problems

The present invention provides:

a polyimide solution including: (a) a resin containing 50 mol % or more, based on the total amount of the resin, of a structural unit represented by the general formula (1); and (b) a solvent.

[Chemical Formula 1]

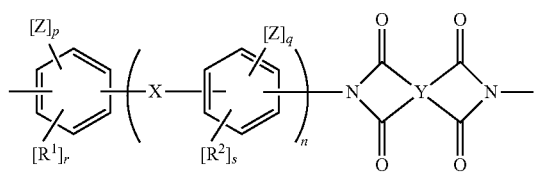

(1)

(In the formula, $R^1$ and $R^2$ each independently represent an alkyl group with a carbon number of 1 to 10, a fluoroalkyl group, a cyano group or a nitro group, and Z represents a hydroxyl group or a carboxyl group. Y represents a tetravalent organic group with a carbon number of 4 to 30. X represents one of the structures shown below. p, q, r and s each represent an integer of 0 to 4, where p+q is larger than 1. n represents an integer of 0 to 4. $R^3$ and $R^4$ each independently represent a hydrogen atom, an alkyl group with a carbon number of 1 to 4, a fluoroalkyl group, or a phenyl group. $R^5$ to $R^{11}$ each represent an alkyl group with a carbon number of 1 to 4, a fluoroalkyl group or a phenyl group, and may be the same or different. t represents an integer of 0 to 3.)

[Chemical Formula 2]

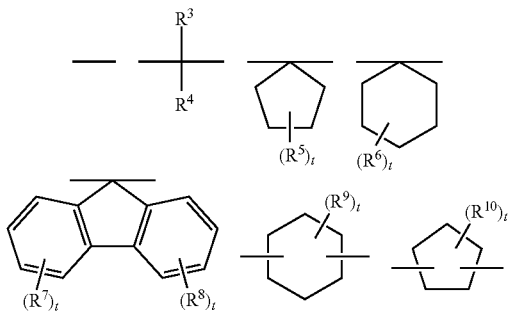

-continued

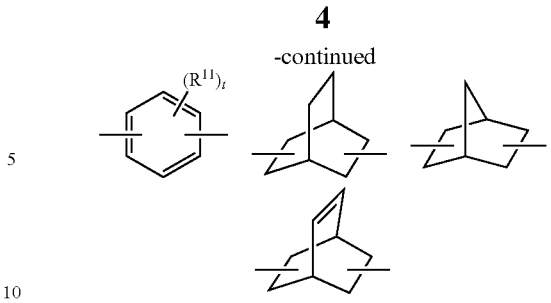

The present invention provides a non-woven fabric formed using the polyimide solution of the present invention. The present invention also provides a method for manufacturing a non-woven fabric by spinning a polyimide on a substrate by electrospinning. The present invention also provides an acoustic material, an electromagnetic shielding material, a separation filter, a heat-resistant bag filter, a separator for batteries, and a separator for electric double layer capacitors, each of which is obtained using the non-woven fabric of the present invention.

Effects of the Invention

According to the present invention, a polyimide having a water-soluble substituent is obtained although the polyimide itself has low moisture absorption properties. Thus, a polyimide solution can be obtained in which even if the amount of water in the polyimide solution increases, the solubility of the polyimide in the polyimide solution is not reduced to cause whitening of the solution. By using the polyimide solution, a fiber with a stable shape can be formed even if the temperature and the humidity in fiber production somewhat change. As a result, a desired non-woven fabric can be obtained without necessity to place an apparatus in a booth in which the temperature and the humidity can be controlled on a large scale.

EMBODIMENTS OF THE INVENTION

A polyimide solution of the present invention includes: (a) a resin containing 50 mol % or more, based on the total amount of the resin, of a structural unit represented by the general formula (1); and (b) a solvent.

It is absolutely necessary that a polyimide have such a structure that the polyimide is soluble in a solvent, and the specific inductive capacity is preferably 3.2 or more for forming a fiber with a stable shape.

A non-woven fabric of the present invention is obtained by spinning a polyimide solution by electrospinning.

[Chemical Formula 3]

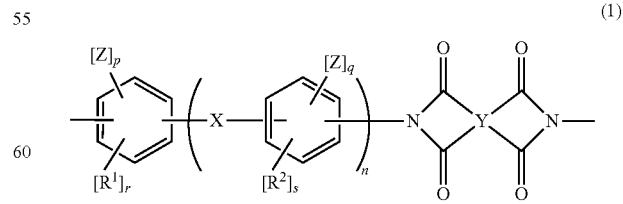

(1)

A structure represented by the general formula (1) is a structural unit of the polyimide. The structural unit represented by the general formula (1) includes a highly polar component such as a sulfone group, a ketone group or a hydroxyl group, and has such a characteristic that even if water is mixed in a solvent in the polyimide solution, the polyimide is hardly precipitated from the solvent. The structural unit enhances solubility of N-methylpyrrolidone, dimethylacetamide and the like in an aprotic organic solvent. In electrospinning, a high voltage is applied to the polyimide solution to attract charges to liquid droplets at the tip of a nozzle, and the charges are mutually repelled to spread the liquid droplets, so that a solution flow is drawn to perform spinning. Electrospinning is suitable particularly for obtaining a fiber with a small diameter of not more than μm size. However, when the humidity of an atmosphere in which a voltage of the polyimide solution is applied to the polyimide solution to scatter the solution, water infiltrates into the polyimide solution. As a result, the polyimide is precipitated from the polyimide solution in the middle, so that a white fragile film-shaped solid is generated. For suppressing the generation of the solid, it has been necessary heretofore that the humidity of an atmosphere in which electrospinning is performed be generally set to be low.

The polyimide to be used in the polyimide solution of the present invention is hardly whitened owing to the highly polar component introduced into the polyimide even when water infiltrates into the solvent.

In the (a) structure represented by the general formula (1) in the present invention, X represents any one of the structures shown below, Z represents a hydroxyl group or a carboxyl group, and p and q each represent an integer of 0 to 4. For forming a fiber with a stable fine shape, p+q is larger than 1 for introduction of a hydroxyl group and a carboxyl group which contribute to an increase in dielectric constant.

For forming a fiber with a stable fine shape, each of p and q may be equal to 0 only when X represents a sulfonyl group or a ketone group which is polar group that contributes to an increase in dielectric constant.

[Chemical Formula 4]

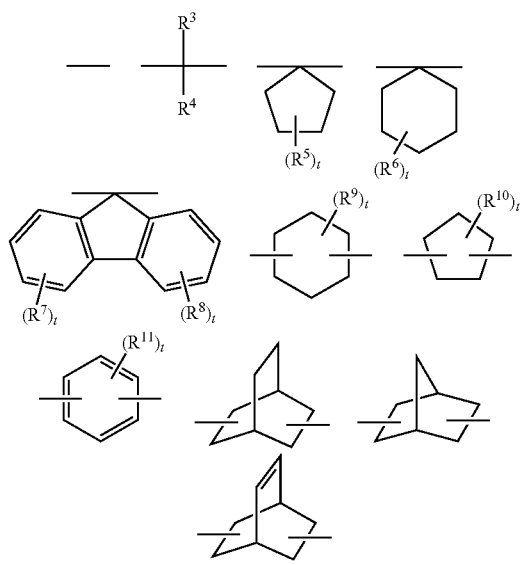

$R^3$ and $R^4$ each independently represent a hydrogen atom, an alkyl group with a carbon number of 1 to 4, a fluoroalkyl group, or a phenyl group.

For suppressing moisture absorption of the resulting polyimide solution to form a fiber with a further stable fine shape, $R^3$ and $R^4$ are each preferably an alkyl group with a carbon number of 1 to 4 or a fluoroalkyl group, more preferably an isopropyl group or a hexafluoroisopropyl group.

$R^5$ to $R^{11}$ each represent an alkyl group with a carbon number of 1 to 4, a fluoroalkyl group or a phenyl group, and may be the same or different. t represents an integer of 0 to 3.

Examples of the diamine having a hydroxyl group or a carboxyl group may include 2,2-bis(aminohydroxyphenyl) hexafluoropropane and bis(aminohydroxyphenyl)fluorene. It is also preferred to use bis(aminohydroxyphenyl)anthracene, bis(aminohydroxyphenyl)naphthalene or bis(aminohydroxyphenyl)perfluorobutane. Mention may also be made of a diamine compound with a hydroxyl group or carboxyl group replacing a hydrogen atom added to an aromatic ring in a diamine compound such as diaminotoluene, diaminotrifluoromethylbenzene, diaminoxylene, bis(trifluoromethyl)diaminobiphenyl, diaminodimethylbiphenyl, bis(trifluoromethyl)diaminobiphenyl, diaminodiethylbiphenyl or bis (tripentafluoroethyl)diaminobiphenyl.

When X represents a sulfonyl group or a ketone group which is a polar group that contributes to an increase in dielectric constant, examples of the preferred diamine may include 3,4'-diaminodiphenyl sulfone, 3,3'-diaminodiphenyl sulfone, 4,4'-diaminodiphenyl sulfone, 3,4'-diaminodiphenyl ketone, 3,3'-diaminodiphenyl ketone and 4,4'-diaminodiphenyl ketone.

The structure represented by the general formula (1) in the present invention includes a structure in which a group represented by each of $R^1$ and $R^2$, i.e. an alkyl group with a carbon number of 1 to 10, a fluoroalkyl group, a cyano group or a nitro group, is bonded to a benzene ring. Preferably, the structure represented by the general formula (1) includes a structure in which at least one a methyl group, an ethyl group, a propyl group, a butyl group, a trifluoromethyl group, a pentafluoroethyl group, a perfluoropropyl group or a perfluorobutyl group as each of $R^1$ and $R^2$ is bonded to a benzene ring. Examples of the above-mentioned structure may include of diaminotoluene, diaminotrifluoromethylbenzene, diaminoxylene, bis(trifluoromethyl)diaminobiphenyl, diaminodimethylbiphenyl, bis(trifluoromethyl)diaminobiphenyl, diaminodiethylbiphenyl and bis(tripentafluoroethyl) diaminobiphenyl. Mention may also be made of a residue of a diamine compound in which a hydrogen atom added to an aromatic ring contained in 2,2-bis(aminohydroxyphenyl) hexafluoropropane, bis(aminohydroxyphenyl)fluorene or the like is replaced by a group represented by each of $R^1$ and $R^2$, i.e. an alkyl group with a carbon number of 1 to 10, a fluoroalkyl group, a cyano group or a nitro group.

r and s each represent an integer of 0 to 4. Preferably, each of r and s is equal to 0 from the viewpoint of the strength of the resulting polyimide non-woven fabric.

Preferably, 5 to 50 mol % of the structure of X is constituted by any one of the structures shown below. When the ratio of the structure shown below is below the above-mentioned range, the effect of forming a fiber with a stable fine shape by suppression of moisture absorption is not obtained, and when the ratio of the structure shown below is above this range, destabilization of the fiber due to a reduction in polarity becomes more prominent than suppression of moisture absorption.

[Chemical Formula 5]

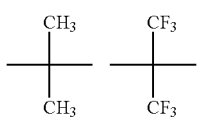

For forming a fiber with a stable fine shape, it is most preferable that 40 to 95 mol % of X is constituted by any one of the structures shown below.

[Chemical Formula 6]

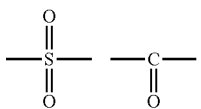

The (a) structure represented by the general formula (1) in the present invention is a structural unit of the polyimide. The polyimide can be obtained by reacting a diamine with a tetracarboxylic acid.

Particularly for causing the reaction to easily proceed, it is preferred to react a tetracarboxylic acid dianhydride with a diamine. The polyimide can also be obtained by reacting a dichloride or diester of a tetracarboxylic acid with a diamine.

The residue of a tetracarboxylic acid in the structure represented by the general formula (1) corresponds to a moiety represented by Y, and Y represents a tetravalent organic group with a carbon number of 4 to 30. Preferably, the residue of a tetracarboxylic acid, which is represented by Y, contains an organic group including benzene, cyclobutane, cycloheptane, cyclohexane, naphthalene, biphenyl, terphenyl, diphenyl ether, triphenyl ether, diphenylmethane, diphenylhexafloropropane, diphenyl sulfone or diphenyl ketone.

Examples of the tetracarboxylic acid including the above-mentioned structure include aromatic tetracarboxylic acids such pyromellitic acid, naphthalenetetracarboxylic acid, biphenyltetracarboxylic acid, terphenyltetracarboxylic acid, diphenylethertetracarboxylic acid, triphenylethertetracarboxylic acid, diphenylmethanetetracarboxylic acid, diphenylhexafluoropropanetetracarboxylic acid, diphenylsulfonetetracarboxylic acid and diphenylketonetetracarboxylic acid; and monocyclic tetracarboxylic acids such as cyclobutanetetracarboxylic acid, cyclohexanetetracarboxylic acid and cycloheptanetetracarboxylic acid.

Examples of the compound that can also be used in combination include monocyclic tetracarboxylic acids such as perfluoropentanetetracarboxylic acid, bis(trifluoromethyl)pyromellitic acid, bis(perfluoroethyl)pyromellitic acid, cyclopropanetetracarboxylic acid, cyclopentanetetracarboxylic acid, cyclooctanetetracarboxylic acid, cyclononanetetracarboxylic acid, cyclodecanetetracarboxylic acid, cycloundecanetetracarboxylic acid and cyclododecanetetracarboxylic acid; aromatic benzophenonetetracarboxylic acids; tetracarboxylic acids having a fused ring structure, such as bicyclo[2.2.2]octa-7-en-2,3,5,6-tetracarboxylic acid, pentacyclo[8.2.1.1$^{4,7}$.0$^{2,9}$.0$^{3,8}$]tetradecane-5,6,11,12-tetracar boxylic acid, bicyclo[2.2.2]octa-7-en-2,3,5,6-tetracarboxylic acid, pentacyclo[8.2.1.1$^{4,7}$.0$^{2,9}$.0$^{3,8}$]tetradecane-5,6, 11,12-tetracar boxylic acid, pentacyclo[8.2.1.1$^{4,7}$.0$^{2,9}$.0$^{3,8}$] tetradecane-5,6,11,12-tetracar boxylic acid, bicyclo[2.2.2] octa-7-en-2,3,5,6-tetracarboxylic acid, pentacyclo[8.2.1. 1$^{4,7}$.0$^{2,9}$.0$^{3,8}$]tetradecane-5,6,11,12-tetracar boxylic acid and 1,2,4,5-bicyclohexenetetracarboxylic acid; and ester compounds, acid chloride compounds and amide compounds thereof.

A tricarboxylic acid such as trimellitic acid, or a dicarboxylic acid such as terephthalic acid, isophthalic acid, maleic acid, succinic acid, adipic acid, pentanedicarboxylic acid or decanedicarboxylic acid can be copolymerized in an amount of 50 mol % or less based on the amount of acid components.

From the viewpoint of formation of a fiber with a stable fine shape, preferred specific examples of the residue of the tetracarboxylic acid represented by Y include diphenylsulfonetetracarboxylic acid and diphenylketonetetracarboxylic acid which have a high ratio of polar groups that contribute to an increase in dielectric constant. Preferably, these residues constitute 40 mol % or more of Y.

For increasing the ratio of polar groups to the whole polymer, it is most preferred that the residues of diphenylsulfonetetracarboxylic acid and/or diphenylketonetetracarboxylic acid constitute 40 mol % or more of Y, and also the residue of pyromellitic acid constitutes 5 to 50 mol % of Y. When each of the residues does not fall within a range as described above, formation of a fiber is easily destabilized.

It is desirable to use a polyimide as a resin for use in the present invention because in the case of a solution in the state of a polyamic acid or polyamic acid ester that is a precursor of the polyimide, the solution is heated to close rings to obtain a polyimide after electrospinning. The (a) component for use in the present invention may include a polyimide precursor structure as long as it contains 50 mol % or more, based on the total amount of the resin, of a polyimide structural unit represented by the general formula (1).

The polyimide solution of the present invention is a polyimide solution which contains a resin represented by the general formula (2), and (b) a solvent, and is used for formation of a non-woven fabric.

[Chemical Formula 7]

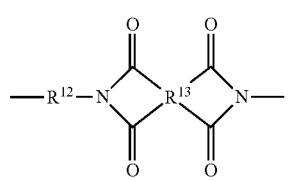

(2)

R$^{12}$ represents a residue of a diamine. R$^{12}$ represents a divalent organic group having at least two carbon atoms, and in particular, an organic group containing an aromatic ring or a cyclic aliphatic group and having 5 to 40 carbon atoms is preferred.

Specific examples of the diamine include 3,4'-diaminodiphenyl ether, 4,4'-diaminodiphenyl ether, 3,4'-diaminodiphenylmethane, 4,4'-diaminodiphenylmethane, 3,4'-diaminodiphenyl sulfone, 3,3'-diaminodiphenyl sulfone, 4,4'-diaminodiphenyl sulfone, 3,4'-diaminodiphenyl ketone, 3,3'-diaminodiphenyl ketone, 4,4'-diaminodiphenyl ketone, 3,4'-diaminodiphenyl sulfide, 4,4'-diaminodiphenyl sulfide, 1,4-bis(4-aminophenoxy)benzene, benzidine, m-phenylenediamine, p-phenylenediamine, 1,5-naphthalenediamine, 2,6-naphthalenediamine, bis(4-aminophenoxyphenyl) sulfone, bis(3-aminophenoxyphenyl) sulfone, bis(4-aminophenoxy)biphenyl, bis[4-(4-aminophenoxy)

phenyl) ether, 1,4-bis(4-aminophenoxy)benzene, 2,2'-dimethyl-4,4'-diaminobiphenyl, 2,2'-diethyl-4,4'-diaminobiphenyl, 3,3'-dimethyl-4,4'-diaminobiphenyl, 3,3'-diethyl-4,4'-diaminobiphenyl, 2,2',3,3'-tetramethyl-4,4'-diaminobiphenyl, 3,3',4,4'-tetramethyl-4,4'-diaminobiphenyl, 2,2'-di(trifluoromethyl)-4,4'-diaminobiphenyl, 9,9-bis(4-aminophenyl)fluorene, 2,2-bis(aminophenyl)hexafluoropropane and bis(aminophenyl) sulfone; compounds in which at least some of hydrogen atoms of aromatic rings of the above-mentioned compound are replaced by alkyl groups, halogen atoms, hydroxyl groups or carboxyl groups; and aliphatic cyclohexyldiamine and methylenebis(cyclohexylamine). Two or more of these compounds may be used.

From the viewpoint of formation of a fiber with a stable shape, preferred specific examples include 9,9-bis(aminohydroxyphenyl)fluorene, 2,2-bis(amnohydroxyphenyl)hexafluoropropane, bis(aminohydroxyphenyl) sulfone, 3,4'-diaminodiphenyl sulfone, 3,3'-diaminodiphenyl sulfone, 4,4'-diaminodiphenyl sulfone, 3,4'-diaminodiphenyl ketone, 3,3'-diaminodiphenyl ketone and 4,4'-diaminodiphenyl ketone, each of which has a high ratio of polar groups that contribute to an increase in dielectric constant.

$R^{13}$ represents a residue of an acid dianhydride. $R^{13}$ represents a tetravalent organic group having at least two carbon atoms, and in particular, an organic group containing an aromatic ring or a cyclic aliphatic group and having 5 to 40 carbon atoms is preferred.

Specific examples of the acid dianhydride include aromatic tetracarboxylic acid dianhydrides such as pyromellitic dianhydride, 3,3',4,4'-biphenyltetracarboxylic dianhydride, 2,3,3',4'-biphenyltetracarboxylic dianhydride, 2,2',3,3'-biphenyltetracarboxylic dianhydride, 3,3',4,4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, 1,1-bis(3,4-dicarboxyphenyl)ethane dianhydride, 1,1-bis(2,3-dicarboxyphenyl)ethane dianhydride, bis(3,4-dicarboxyphenyl)methane dianhydride, bis(2,3-dicarboxyphenyl)methane dianhydride, bis(3,4-dicarboxyphenyl)sulfone dianhydride, bis(3,4-dicarboxyphenyl)ether dianhydride, 1,2,5,6-naphthalenetetracarboxylic dianhydride, 9,9-bis(3,4-dicarboxyphenyl)fluorene dianhydride, 9,9-bis[4-(3,4-dicarboxyphenoxy)phenyl)fluorene dianhydride, 2,3,6,7-naphthalenetetracarboxylic dianhydride, 2,3,5,6-pyridinetetracarboxylic dianhydride, 3,4,9,10-perylenetetracarboxylic dianhydride, 2,2-bis(3,4-dicarboxyphenyl)hexafluoropropane dianhydride, 3,3'4,4'-diphenylsulfonetetracarboxylic dianhydride, and acid dianhydrides of the structures shown below; and aliphatic tetracarboxylic acid dianhydrides such as butanetetracarboxylic anhydride and 1,2,3,4-cyclopentanetetracarboxylic anhydride. Two or more of these compounds may be used. From the viewpoint of formation of a fiber with a stable shape, preferred specific examples include pyromellitic dianhydride, 3,3',4,4'-benzophenonetetracarboxylic dianhydride, 2,2',3,3'-benzophenonetetracarboxylic dianhydride and bis(3,4-dicarboxyphenyl)sulfone dianhydride, each of which has a high ratio of polar groups that contribute to an increase in dielectric constant.

The polyimide precursor and polyimide for use in the present invention are obtained by reacting an acid anhydride with a diamine in a generally known aprotic solvent such as N-methylpyrrolidone or dimethylacetamide. The reaction produces a polyamic acid at 60° C. or lower, and produces a polyimide at a temperature higher than 60° C. A polyamic acid ester can be obtained generally by reacting an acid anhydride with an alcohol in the presence of a catalyst such as pyridine or triethylamine, and then forming the dicarboxylic acid into an acid chloride with sulfonyl chloride, succinyl chloride, thionyl chloride or the like, or polymerizing the dicarboxylic acid using a condensation agent such as dicyclohexylcarbodiimide.

As an organic solvent to be used as a reaction solvent, any solvent can be used as long as the polyimide according to the present invention is soluble in the solvent. Generally, an aprotic polar solvent is preferred. Examples of the aprotic polar solvent include diphenyl sulfone, dimethyl sulfoxide, sulfolane, dimethyl sulfone, N,N-dimethylformamide, N,N-dimethylacetamide, N-methyl-2-pyrrolidone, diethyl sulfone, diethyl sulfoxide, 1,4-dimethylbendazolidinone, hexatrimethyltriamide and 1,3-dimethylimidazolidinone.

Further, examples of the aprotic polar solvent include high-boiling-point ketones solvents such as cyclohexanone; and glycols solvents such as ethylene glycol dimethyl ether, diethylene glycol dimethyl ether, diethylene glycol methyl ethyl ether, diethylene glycol diethyl ether, propylene glycol dimethyl ether, propylene glycol methyl ethyl ether, propylene glycol diethyl ether, dipropylene glycol dimethyl ether, dipropylene glycol methyl ethyl ether and dipropylene glycol diethyl ether. To these solvents can also be added aromatic hydrocarbons solvents such as toluene and xylene; and esters solvent such as propylene glycol monomethylether acetate and methyl-methoxybutanol acetate.

The amount of the solvent to be used in polycondensation is preferably 50 parts by weight or more, more preferably 200 parts by weight or more based on 100 parts by weight of the weight of all monomers. When the amount of the solvent is 50 parts by weight or more based on the weight of all monomers, operations such as stirring are facilitated, so that the polycondensation reaction easily smoothly proceeds. The amount of the solvent is preferably 2000 parts by weight or less, more preferably 800 parts by weight or less. When the amount of the solvent is 2000 parts by weight or less, the concentration of monomers in the solvent increases, so that the polymerization velocity is improved, and therefore a high-molecular-weight polymer having a weight-average molecular weight of 30,000 or more can be obtained. In the present invention, the solvent used as a reaction solvent for the resin can be used as such as a solvent for the polyimide solution.

The weight-average molecular weight of the resin in the present invention is preferably in the range of 5,000 to 100,000, especially preferably in the range of 10,000 to 100,000. The weight-average molecular weight in the present invention is a value calculated in the following manner: the molecular weight of a polyimide resin is measured by a gel permeation chromatography (GPC) method using a solvent with 1 M-concentration lithium chloride added to a mixed solvent of $NMP/H_3PO_4$, and the weight average molecular weight is determined using a calibration curve for standard polystyrene.

To the polyimide solution of the present invention can be added a surface acting agent. To the polyimide solution can also be added a photodegradable diazonaphthoquinone compound or a coumarin compound for improving degradability, and a silane coupling agent, a titan chelate or an aluminum chelate for improving adhesion properties. A crosslinkable compound such as a polyfunctional epoxy compound, oxetane compound, methylol compound or alkoxymethylol compound can also be added for the purpose of improving chemical resistance. Fine particles of silica or the like can also be added for increasing hardness. These additive components can be added in an amount of 1 ppm to about 30% by weight to the polyimide component.

A non-woven fabric formed using the polyimide solution of the present invention will be described. The non-woven fabric to be manufactured using the polyimide solution of the present invention is manufactured by electrospinning. The electrospinning is a method in which a high voltage is applied to the polyimide solution to attract charges to liquid droplets at the tip of a nozzle, and the charges are mutually repelled to spread the liquid droplets, so that a solution flow is drawn to perform spinning. In this method, a fiber with a small diameter can be obtained. Thus, according to electrospinning, a fine fiber with a diameter of several tens nm to several μm is obtained, and as a result, a thin non-woven fabric with a thickness of 10 μm can be formed. Since the non-woven fabric is spun from a polyimide solution that has been already imidized, a heating treatment for imidization after spinning is not required, and a non-woven fabric having excellent thermal resistance and mechanical properties can be obtained in a very simple manner.

The polyimide solution of the present invention contains a highly polar sulfone group, ketone group, hydroxyl group or carboxyl group. Thus, even if water is mixed in a solvent in the polyimide solution, the solubility of the polyimide itself can be kept high, and therefore the polyimide is hardly precipitated from the solvent. Hitherto, there has been the problem that when an electrospinning process is carried out in a high-humidity atmosphere, water infiltrates into the polyimide solution, so that a polymer is precipitated in the polyimide solution in the middle of the spinning process, leading to generation of a white fragile film-shaped solid. However, when the polyimide solution of the present invention is used, the polymer is hardly precipitated from the polyimide solution, and even if the humidity in the electrospinning process somewhat changes, a fiber with a stable shape can be formed. As a result, a non-woven fabric can be stably obtained in a simple booth without necessity to place an electrospinning apparatus in a booth in which the temperature and the humidity can be controlled on a large scale.

A highly polar polyimide structure has a strong polymer intermolecular force, and therefore exhibits a high glass-transition point in a desolventized state after electrospinning. The glass-transition point is preferably 200° C. or higher from the viewpoint of application to a heat-resistant non-woven fabric. When the glass-transition point is lower than 200° C., the structure of the non-woven fabric changes due to softening caused by heat, and therefore performance may be deteriorated with a temporal change.

The non-woven fabric of the present invention can be used as a high-order processed article in heat-resistant bag filters, electromagnetic shielding materials, core materials for low dielectric constant substrates, gas separation membranes, electrodes for batteries and capacitors, separators, heat insulation acoustic materials and so on. Particularly, separators for batteries and electric double layer capacitors in which the non-woven fabric of the invention of the present application is used have high thermal resistance and a small thickness. Thus, the porosity increases, so that batteries and capacitors having excellent short-time charge and discharge properties can be obtained.

EXAMPLES

Hereinafter, the present invention will be described by showing examples and techniques, but the present invention is not limited to these examples.

<Measurement of Water Absorption Ratio>

A 6-inch silicon wafer was spin-coated with a polyimide solution in such a manner that the film thickness would be about 15 μm after drying at 120° C. for 4 minutes. After the spin-coating, the coated solution was dried at 120° C. for 4 minutes by a hot plate attached to coating and developing equipment SCW-636 manufactured by Dainippon Screen Mfg. Co., Ltd., and was then subjected to a heating treatment at 300° C. for 1 hour using an inert oven INH-9CD manufactured by Koyo Thermo Systems Co., Ltd., thereby obtaining a polyimide film. The wafer with the film formed thereon was immersed in 45% aqueous hydrogen fluoride at room temperature for 3 minutes, and washed with deionized water for 10 minutes, and the film was separated from the wafer. The weight of the film was measured, the film was then dried at 200° C. for 1 hour, and the bone-dry weight was determined. The water absorption ratio was determined from the water-absorbing weight and the bone-dry weight using the following equation.

water absorption ratio=(water-absorbing weight−bone-dry weight)/bone-dry weight×100(%)

<Measurement of Specific Inductive Capacity>

An aluminum substrate was spin-coated with a polyimide solution. After the spin-coating, the coated solution was dried at 120° C. for 4 minutes by a hot plate attached to coating and developing equipment SCW-636 manufactured by Dainippon Screen Mfg. Co., Ltd., and was then subjected to a heating treatment at 300° C. for 1 hour using an inert oven INH-9CD manufactured by Koyo Thermo Systems Co., Ltd., thereby obtaining a polyimide film with a thickness of 5 μm. An upper aluminum electrode was deposited on the film using vacuum deposition equipment EBH-6 manufactured by Japan Vacuum Engineering Co., Ltd., thereby obtaining a measurement sample.

The capacitance at 1 MHz was then measured using a LCR meter 4284 A manufactured by Yokogawa Hewlett-Packard, and the specific inductive capacity ($\in$) was determined from the following equation.

$$\in = C \cdot d / \in_0 \cdot S$$

(where C is a capacitance (unit: F), d is a sample film thickness (unit: m), $\in_0$ is a dielectric constant in vacuum, and S is an upper electrode area (unit: m$^2$))

<Measurement of Glass-Transition Point>

A silicon substrate was spin-coated with a polyimide solution. After the spin-coating, the coated solution was dried at 120° C. for 4 minutes by a hot plate attached to coating and developing equipment SCW-636 manufactured by Dainippon Screen Mfg. Co., Ltd., and was then subjected to a heating treatment at 300° C. for 1 hour using an inert oven INH-9CD manufactured by Koyo Thermo Systems Co., Ltd., thereby obtaining a polyimide film with a thickness of 10 μm. The wafer with the film formed thereon was immersed in 45% aqueous hydrogen fluoride at room temperature for 3 minutes, and washed with deionized water for 10 minutes, and the film was separated from the wafer. The film was dried at 120° C. for 2 hours to remove water, and cut out so as to have a weight of 5 mg. The sample was heated from room temperature to 400° C. at a temperature rise rate of 10° C./min to measure the glass-transition point using DSC-50 manufactured by Shimadzu Corporation.

Example 1

In a 500 mL three-necked flask equipped with a N$_2$ gas inflow glass tube, a stirrer and a thermometer, 3.66 g of 2,2-bis(3-amino-4-hydroxyphenyl)hexafluoropropane (0.01 mol; manufactured by AZ Electronic Materials Co., Ltd.) and 3.20 g of 2,2'-bis(trifluoromethyl)-4,4'-diaminobiphenyl (0.01 mol; manufactured by Wakayama Seika Kogyo Co., Ltd.) were dissolved in 30 g of N-methyl-2-pyrrolidone (NMP; manufactured by Mitsubishi Chemical Corporation) and 10 g of toluene (manufactured by Tokyo Chemical Industry Co., Ltd.) under a dry nitrogen gas flow at 40° C. or lower. To the solution was added 4.36 g of pyromellitic dianhydride (0.02 mol; manufactured by Daicel Chemical Industries, Ltd.), the mixture was stirred at 40° C. for 2 hours, the liquid temperature was then raised to 180° C., and the mixture was further stirred for 4 hours, and reacted while distilled toluene and water were removed.

The resin solution thus obtained was filtered by a 2 μm of polytetrafluoroethylene membrane filter to obtain a polyimide solution. A 4-inch silicon wafer was spin-coated with the polyimide solution in an atmosphere at room temperature and a humidity of 50%. The solution was not whitened even after being left standing for 120 seconds after the coating.

The water absorption ratio was 1.9%, the specific inductive capacity was 2.9, and the glass-transition point was 170° C.

Example 2

In a 500 mL three-necked flask equipped with a $N_2$ gas inflow grass tube, a stirrer and a thermometer, 22.8 g of bis(3-amino-4-hydroxyphenyl)fluolene (0.06 mol; manufactured by AZ Electronic Materials Co., Ltd.) and 4.88 g of 2,4-diaminotoluene (0.04 mol; manufactured by Tokyo Chemical Industry Co., Ltd.) were dissolved in 235 g of NMP and 10 g of toluene (manufactured by Tokyo Chemical Industry Co., Ltd.) under a dry nitrogen gas flow at 40° C. or lower. To the solution was added 31.0 g of 3,3',4,4'-diphenylethertetracarboxylic dianhydride (0.1 mol; manufactured by MANAC Inc.), and the mixture was stirred at 40° C. for 1 hour, the temperature of the solution was then raised to 180° C., and the solution was stirred for 6 hours.

The resin solution thus obtained was filtered by a 2 μm of polytetrafluoroethylene membrane filter to obtain a polyimide solution. A 4-inch silicon wafer was spin-coated with the polyimide solution in an atmosphere at room temperature and a humidity of 50%. The solution was not whitened even after being left standing for 120 seconds after the coating.

The water absorption ratio was 1.5%, the specific inductive capacity was 3.2, and the glass-transition point was 200° C.

Example 3

In a 500 mL three-necked flask equipped with a $N_2$ gas inflow glass tube, a stirrer and a thermometer, 11.5 g of 2,2-bis(3-carboxyl-4-aminophenyl)methane (manufactured by Wakayama Seika Kogyo Co., Ltd.; 0.05 mol) and 12.8 g of 2,2'-bis(trifluoromethyl)-4,4'-diaminobiphenyl (manufactured by Wakayama Seika Kogyo Co., Ltd.; 0.04 mol) and 2.48 g of 1,3-bis(3-aminopropyl)tetramethyldisiloxane (manufactured by Shin-Etsu Chemical Co., Ltd.; 0.01 mol) were dissolved in 240 g of NMP under a dry nitrogen gas flow at 40° C. or lower. To the solution were added 10.9 g of pyromellitic dianhydride (manufactured by Daicel Chemical Industries, Ltd.; 0.05 mol) and 22.2 g of 2,2-bis (hexafluoropropane)phthallic anhydride (0.05 mol; manufactured by Daikin Industries, Ltd.), the mixture was stirred at 40° C. for 2 hours, the liquid temperature was then raised to 180° C., and the mixture was further stirred for 4 hours, and reacted while distilled toluene and water were removed.

The resin solution thus obtained was filtered by a 2 μm of polytetrafluoroethylene membrane filter to obtain a polyimide solution. A 4-inch silicon wafer was spin-coated with the polyimide solution in an atmosphere at room temperature and a humidity of 50%. The solution was not whitened even after being left standing for 120 seconds after the coating.

The water absorption ratio was 2.5%, the specific inductive capacity was 3.0, and the glass-transition point was 180° C.

Example 4

In a 500 mL three-necked flask equipped with a $N_2$ gas inflow glass tube, a stirrer and a thermometer, 28.0 g of bis(3-amino-4-hydroxyphenyl) sulfone (0.1 mol; manufactured by AZ Electronic Materials Co., Ltd.) was dissolved in 230 g of NMP and 10 g of toluene under a dry nitrogen gas flow at 40° C. To the solution were added 10.9 g of pyromellitic dianhydride (manufactured by Daicel Chemical Industries, Ltd.; 0.05 mol) and 17.9 g of 3,3',4,4'-diphenylsulfonetetracarboxylic dianhydride (0.05 mol; manufactured by New Japan Chemical Co., Ltd.), the mixture was stirred at 40° C. for 2 hours, the liquid temperature was then raised to 180° C., and the mixture was further stirred for 4 hours, and reacted while distilled toluene and water were removed.

The resin solution thus obtained was filtered by a 2 μm of polytetrafluoroethylene membrane filter to obtain a polyimide solution. A 4-inch silicon wafer was spin-coated with the polyimide solution in an atmosphere at room temperature and a humidity of 50%. The solution was not whitened even after being left standing for 120 seconds after the coating. The water absorption ratio was 9.0%, the specific inductive capacity was 3.6, and the glass-transition point was 220° C.

Example 5

In a 500 mL three-necked flask equipped with a $N_2$ gas inflow glass tube, a stirrer and a thermometer, 14.9 g of bis(3-amino-4-hydroxyphenyl)cyclohexane (0.05 mol; manufactured by Tokyo Chemical Industry Co., Ltd.) and 12.8 g of 2,2'-bis(trifluoromethyl)-4,4'-diaminobiphenyl (0.04 mol; manufactured by Wakayama Seika Kogyo Co., Ltd.) and 2.48 g of 1,3-bis(3-aminopropyl)tetramethyldisiloxane (manufactured by Shin-Etsu Chemical Co., Ltd.; 0.01 mol) were dissolved in 205 g of NMP under a dry nitrogen gas flow at 40° C. or lower. To the solution were added 10.9 g of pyromellitic dianhydride (0.05 mol; manufactured by Daicel Chemical Industries, Ltd.) and 9.8 g of cyclobutanoic anhydride (0.05 mol; manufactured by Tokyo Chemical Industry Co., Ltd.), the mixture was stirred at 40° C. for 2 hours, the liquid temperature was then raised to 180° C., and the mixture was further stirred for 4 hours, and reacted while distilled toluene and water were removed.

The resin solution thus obtained was filtered by a 2 μm of polytetrafluoroethylene membrane filter to obtain a polyimide solution. A 4-inch silicon wafer was spin-coated with the polyimide solution in an atmosphere at room temperature and a humidity of 50%. The solution was not whitened even after being left standing for 120 seconds after the coating.

The water absorption ratio was 1.4%, the specific inductive capacity was 2.9, and the glass-transition point was 190° C.

Example 6

In a 500 mL three-necked flask equipped with a $N_2$ gas inflow glass tube, a stirrer and a thermometer, 1.04 g of bis(3-amino-4-hydroxyphenyl)cyclopentane (0.05 mol; manufactured by Tokyo Chemical Industry Co., Ltd.) and 2,2'-bis(trifluoromethyl)-4,4'-diaminobiphenyl (0.05 mol; manufactured by Wakayama Seika Kogyo Co., Ltd.) were dissolved in 40 g of N-methyl-2-pyrrolidone (NMP; manufactured by Mitsubishi Chemical Corporation) under a dry nitrogen gas flow at 40° C. or lower. To the solution were added 10.9 g of pyromellitic dianhydride (0.05 mol; manufactured by Daicel Chemical Industries, Ltd.) and 22.2 g of cyclobutanoic anhydride (0.05 mol; manufactured by Tokyo Chemical Industry Co., Ltd.), the mixture was stirred at 40° C. for 2 hours, the liquid temperature was then raised to 180° C., and the mixture was further stirred for 4 hours, and reacted while distilled toluene and water were removed.

The resin solution thus obtained was filtered by a 2 μm of polytetrafluoroethylene membrane filter to obtain a polyimide solution. A 4-inch silicon wafer was spin-coated with the polyimide solution in an atmosphere at room temperature and a humidity of 50%. The solution was not whitened even after being left standing for 120 seconds after the coating.

The water absorption ratio was 1.5%, the specific inductive capacity was 2.9, and the glass-transition point was 180° C.

Comparative Example 1

In a 500 mL three-necked flask equipped with a $N_2$ gas inflow glass tube, a stirrer and a thermometer, 2.8 g of 4,4'-diaminodiphenyl ether (0.05 mol; manufactured by Wakayama Seika Kogyo Co., Ltd.) and 1.60 g of 2,2'-bis(trifluoromethyl)-4,4'-diaminobiphenyl (0.05 mol; manufactured by Wakayama Seika Kogyo Co., Ltd.) were dissolved in 40 g of NMP and 10 g of toluene (manufactured by Tokyo Chemical Industry Co., Ltd.) in under a dry nitrogen gas flow at 40° C. To the solution was added 22.2 g of 2,2-bis(hexafluoroisopropylidene)phthallic anhydride (0.05 mol; manufactured by Daikin Industries, Ltd.), the mixture was stirred at 40° C. for 2 hours, the liquid temperature was then raised to 180° C., and the mixture was further stirred for 4 hours, and reacted while distilled toluene and water were removed.

The resin solution thus obtained was filtered by a 2 μm of polytetrafluoroethylene membrane filter to obtain a polyimide solution. A 4-inch silicon wafer was spin-coated with the polyimide solution in an atmosphere at room temperature and a humidity of 50%. The whole coated film was whitened due to moisture absorption 30 seconds after the coating.

The water absorption ratio was 1.0%, the specific inductive capacity was 2.6, and the glass-transition point was 170° C.

Example 7

The polyimide solution obtained in Example 1 was diluted to a concentration of 12%, and applied onto an earthed aluminum foil at a voltage of 15 kV under an environment at a temperature of 24° C. and a humidity of 50% using an electrospray coater while the solution was fed at the rate of 20 μL/min using a needle having a nozzle inner diameter of 0.84 mm (G18) (the distance between the nozzle and the aluminum foil was 250 mm). As a result, a polyimide non-woven fabric was formed on the aluminum foil.

Comparative Example 2

The same procedure as in Example 7 was carried out to prepare a polyimide non-woven fabric from the polyimide solution obtained in Comparative Example 1, but moisture absorption occurred, so that a white fragile film was formed, and thus a tough non-woven fabric was not obtained.

Examples 8 to 25 and Comparative Example 3

Except that a diamine, an amount of NMP and an acid dianhydride as shown in Tables 1 and 2 were used in place of 3.66 g of 2,2-bis(3-amino-4-hydroxyphenyl)hexafluoropropane (0.01 mol; manufactured by AZ Electronic Materials Co., Ltd.), 3.20 g of 2,2'-bis(trifluoromethyl)-4,4'-diaminobiphenyl (0.01 mol; manufactured by Wakayama Seika Kogyo Co., Ltd.), 30 g of N-methyl-2-pyrrolidone (NMP; manufactured by Mitsubishi Chemical Corporation) and 4.36 g of pyromellitic dianhydride (0.02 mol; manufactured by Daicel Chemical Industries, Ltd.), the same procedure as in Example 1 was carried out to obtain a polyimide solution. A 4-inch silicon wafer was spin-coated with the polyimide solution in an atmosphere at room temperature and a humidity of 50%, and occurrence of whitening over the whole coated film, and the water absorption ratio, the specific inductive capacity and the glass-transition point of the coated film were measured.

Examples 26 to 48 and Comparative Example 4

Using the polyimide solution obtained in each of Examples 2 to 6, Examples 8 to 25 and Comparative Example 3, a non-woven fabric formation test was conducted in the same manner as in Example 7, and the non-woven fabric formation state and the average of the diameters of fibers forming the non-woven fabric were measured.

The results of examples and comparative examples are shown in Tables 1, 2 and 3.

TABLE 1

| | Diamine component | Amount of NMP (g) | Acid dianhydride component | Film whitening | Water absorption ratio (%) | Specific inductive | Glass-transition point (°C) |
|---|---|---|---|---|---|---|---|
| Example 1 | 2,2-bis(3-amino-4-hydroxyphenyl)hexafluoropropane (3.66 g) (0.01 mol); manufactured by AZ Electronic Materials Co., Ltd.) 2,2'-bis(trifluoromethyl)-4,4'-diaminobiphenyl (3.20 g) (0.01 mol); manufactured by Wakayama Seika Kogyo Co., Ltd.) 2,4-diaminotoluene (4.88 g) (0.04 mol; manufactured by Tokyo Chemical Industry Co., Ltd.) | 30 | Pyromellitic dianhydride (4.36 g) (0.02 mol); manufactured by Daicel Chemical Industries, Ltd.) | Not observed | 1.9 | 2.9 | 170 |
| Example 2 | bis(3-amino-4-hydroxyphenyl)fluorene (22.8 g) (0.06 mol; manufactured by AZ Electronic Materials Co., Ltd.) 2,2'-bis(trifluoromethyl)-4,4'-diaminobiphenyl (12.8 g) (0.04 mol); manufactured by Wakayama Seika Kogyo Co., Ltd.) | 235 | 3,3',4,4'-diphenylethertetracarboxylic dianhydride (31.0 g) (0.1 mol); manufactured by MANAC Inc.) | Not observed | 1.5 | 3.2 | 2.00 |
| Example 3 | 2,2-bis(3-carboxyl-4-aminophenyl)methane (11.5 g) (0.05 mol); manufactured by Wakayama Seika Kogyo Co., Ltd.) 2,2'-bis(trifluoromethyl)-4,4'-diaminobiphenyl (12.8 g) (0.04 mol); manufactured by Wakayama Seika Kogyo Co., Ltd.) 1,3-bis(3-aminopropyl)tetramethyldisiloxane (2.48 g) (0.01 mol); manufactured by Shin-Etsu Chemical Co., Ltd.) | 240 | Pyromellitic dianhydride (10.9 g) (0.05 mol); manufactured by Daicel Chemical Industries, Ltd.) 2,2-bis(hexafluoropropane) phthalic anhydride (22.2 g) (0.05 mol; manufactured by Daikin Industries, Ltd.) | Not observed | 2.5 | 3 | 180 |
| Example 4 | bis(3-amino-4-hydroxyphenyl) sulfone (28.0 g) (0.01 mol; manufactured by AZ Electronic Materials co., Ltd.) | 230 | Pyromellitic dianhydride (10.9 g) (0.05 mol); manufactured by Daicel Chemical Industries, Ltd.) 3,3',4,4'-diphenylsulfonetetracarboxylic dianhydride (17.9 g) (0.05 mol; manufactured by New Japan Chemical Co., Ltd.) | Not observed | 9 | 3.6 | 220 |
| Example 5 | bis(3-amino-4-hydroxyphenyl)cyclohexane (14.9 g) (0.05 mol); manufactured by Tokyo Chemical Industry Co., Ltd.) 2,2'-bis(trifluoromethyl)-4,4'-diaminobiphenyl (12.8 g) (0.04 mol); manufactured by Wakayama Seika Kogyo Co., Ltd.) 1,3-bis(3-aminopropyl)tetramethyldisiloxane (2.48 g) (0.01 mol); manufactured by Shin-Etsu Chemical Co., Ltd.) | 205 | Pyromellitic dianhydride (10.9 g) (0.05 mol); manufactured by Daicel Chemical Industries, Ltd.) Cyclobutanoic dianhydride (9.8 g) (0.05 mol; manufactured by Tokyo Chemical Industry Co., Ltd.) | Not observed | 1.4 | 2.9 | 190 |
| Example 6 | bis(3-amino-4-hydroxyphenyl)cyclopentane (1.04 g) (0.05 mol); manufactured by Tokyo Chemical Industry Co., Ltd.) 2,2'-bis(trifluoromethyl)-4,4'-diaminobiphenyl (16.0 g) (0.05 mol); manufactured by Wakayama Seika Kogyo Co., Ltd.) | 40 | Pyromellitic dianhydride (10.9 g) (0.05 mol); manufactured by Daicel Chemical Industries, Ltd.) Cyclobutanoic dianhydride (22.2 g) (0.05 mol; manufactured by Tokyo Chemical Industry Co., Ltd.) | Not observed | 1.5 | 2.9 | 180 |
| Example 8 | 3,3'-diaminodiphenyl sulfone (24.3 g); 0.098 mol); manufactured by Wakayama Seika Kogyo Co., Ltd.) bis(3-amino-4-hydroxyphenyl)fluorene (0.760 g) (0.002 mol); manufactured by AZ Electronic Materials Co., Ltd.) | 130 | 3,3',4,4'-diphenylethertetracarboxylic dianhydride (31.0 g) (0.1 mol); manufactured by MANAC Inc.) | Not observed | 3.5 | 3.3 | 180 |
| Example 9 | 3,3'-diaminodiphenyl sulfone (23.6 g); 0.095 mol); manufactured by Wakayama Seika Kogyo Co., Ltd.) bis(3-amino-4-hydroxyphenyl)fluorene (1.90 g) (0.005 mol); manufactured by AZ Electronic Materials Co., Ltd.) | 132 | 3,3',4,4'-diphenylethertetracarboxylic dianhydride (31.0 g) (0.1 mol); manufactured by MANAC Inc.) | Not observed | 2.5 | 3.3 | 190 |

TABLE 1-continued

| | Diamine component | Amount of NMP (g) | Acid dianhydride component | Film whitening | Water absorption ratio (%) | Specific inductive | Glass-transition point (° C.) |
|---|---|---|---|---|---|---|---|
| Example 10 | 3,3′-diaminodiphenyl sulfone (9.93 g): 0.04 mol; manufactured by Wakayama Seiko Kogyo Co., Ltd.) bis(3-amino-4-hydroxyphenyl)fluorene (22.8 g) (0.06 mol; manufactured by AZ Electronic Materials Co. Ltd.) | 149 | 3,3′,4,4′-diphenylethertetracarboxylic dianhydride (31.0 g) (0.1 mol; manufactured by MANAC Inc.) | Not observed | 1.5 | 3.3 | 210 |
| Example 11 | 3,3′-diaminodiphenyl sulfone (7.45 g): 0.03 mol; manufactured by Wakayama Seiko Kogyo Co., Ltd.) bis(3-amino-4-hydroxyphenyl)fluorene (26.6 g) (0.07 mol; manufactured by AZ Electronic Materials Co. Ltd.) | 152 | 3,3′,4,4′-diphenylethertetracarboxylic dianhydride (31.0 g) (0.1 mol; manufactured by MANAC Inc.) | Not observed | 1.5 | 3.2 | 210 |
| Example 12 | 2,2-bis(3-amino-4-hydroxyphenyl)hexafluoropropane (1.83 g) (0.005 mol; manufactured by AZ Materials) bis(3-amino-4-hydroxyphenyl)fluorene (36.1 g) (0.095 mol; manufactured by AZ Electronic Materials Co. Ltd.) | 161 | 3,3′,4,4′-diphenylethertetracarboxylic dianhydride (31.0 g) (0.1 mol; manufactured by MANAC Inc.) | Not observed | 1.5 | 3.2 | 200 |
| Example 13 | 2,2-bis(3-amino-4-hydroxyphenyl)hexafluoropropane (18.3 g) (0.05 mol; manufactured by AZ Materials) bis(3-amino-4-hydroxyphenyl)fluorene (19.0 g) (0.05 mol; manufactured by AZ Electronic Materials Co. Ltd.) | 159 | 3,3′,4,4′-diphenylethertetracarboxylic dianhydride (31.0 g) (0.1 mol; manufactured by MANAC Inc.) | Not observed | 1.2 | 3 | 180 |

TABLE 2

| | Diamine component | Amount of NMP (g) | Acid dianhydride component | Film whitening | Water absorption ratio (%) | Specific inductive | Glass-transition point (°C.) |
|---|---|---|---|---|---|---|---|
| Example 14 | 2,2-bis(3-amino-4-hydroxyphenyl)hexafluoropropane (22.0 g) (0.06 mol; manufactured by AZ Electronic Materials Co., Ltd.) bis(3-amino-4-hydroxyphenyl) fluorene (15.2 g) (0.04 mol; manufactured by AZ Electronic Materials Co., Ltd.) | 159 | 3,3',4,4'-diphenylethertetracarboxylic dianhydride (31.0 g) (0.1 mol; manufactured by MANAC Inc.) | Not observed | 1.2 | 3 | 190 |
| Example 15 | 2,2-bis(3-amino-4-hydroxyphenyl)hexafluoropropane (36.6 g) (0.1 mol; manufactured by AZ Electronic Materials Co., Ltd.) | 158 | 3,3',4,4'-diphenylethertetracarboxylic dianhydride (31.0 g) (0.1 mol; manufactured by MANAC Inc.) | Not observed | 0.8 | 2.9 | 170 |
| Example 16 | bis(3-amino-4-hydroxyphenyl)fluorene (22.8 g) (0.06 mol; manufactured by AZ Electronic Materials Co., Ltd.) 2,4-diaminotoluene (4.88 g) (0.04 mol; manufactured by Tokyo Chemical Industry Co., Ltd.) | 136 | 3,3',4,4'-diphenylethertetracarboxylic dianhydride (29.5 g) (0.095 mol; manufactured by MANAC Inc.) Pyromellitic dianhydride (1.09 g) (0.005 mol; manufactured by Daicel Chemical Industries, Ltd.) | Not observed | 1.5 | 3.2 | 200 |
| Example 17 | bis(3-amino-4-hydroxyphenyl)fluorene (22.8 g) (0.06 mol; manufactured by AZ Electronic Materials Co., Ltd.) 2,4-diaminotoluene (4.88 g) (0.04 mol; manufactured by Tokyo Chemical Industry Co., Ltd.) | 126 | 3,3',4,4'-diphenylethertetracarboxylic dianhydride (15.5 g) (0.05 mol; manufactured by MANAC Inc.) Pyromellitic dianhydride (10.9 g) (0.05 mol; manufactured by Daicel Chemical Industries, Ltd.) | Not observed | 1.5 | 3.3 | 210 |
| Example 18 | bis(3-amino-4-hydroxyphenyl)fluorene (22.8 g) (0.06 mol; manufactured by AZ Electronic Materials Co., Ltd.) 2,4-diaminotoluene (4.88 g) (0.04 mol; manufactured by Tokyo Chemical Industry Co., Ltd.) | 115 | Pyromellitic dianhydride (21.8 g) (0.1 mol; manufactured by Daicel Chemical Industries, Ltd.) | Not observed | 3.2 | 3.3 | 220 |
| Example 19 | bis(3-amino-4-hydroxyphenyl)fluorene (22.8 g) (0.06 mol; manufactured by AZ Electronic Materials Co., Ltd.) 2,4-diaminotoluene (4.88 g) (0.04 mol; manufactured by Tokyo Chemical Industry Co., Ltd.) | 138 | 3,3',4,4'-diphenylethertetracarboxylic dianhydride (21.7 g) (0.07 mol; manufactured by MANAC Inc.) 3,3',4,4'-benzophenonetetracarboxylic dianhydride (9.67 g) (0.03 mol; manufactured by Daicel Chemical Industries, Ltd.) | Not observed | 3.3 | 3.3 | 200 |
| Example 20 | bis(3-amino-4-hydroxyphenyl)fluorene (22.8 g) (0.06 mol; manufactured by AZ Electronic Materials Co., Ltd.) 2,4-diaminotoluene (4.88 g) (0.04 mol; manufactured by Tokyo Chemical Industry Co., Ltd.) | 138 | 3,3',4,4'-diphenylethertetracarboxylic dianhydride (18.6 g) (0.06 mol; manufactured by MANAC Inc.) 3,3',4,4'-benzophenonetetracarboxylic anhydride (12.9 g) (0.04 mol; manufactured by Daicel Chemical Industries, Ltd.) | Not observed | 1.4 | 3.3 | 200 |
| Example 21 | bis(3-amino-4-hydroxyphenyl)fluorene (22.8 g) (0.06 mol; manufactured by AZ Electronic Materials Co., Ltd.) 2,4-diaminotoluene (4.88 g) (0.04 mol; manufactured by Tokyo Chemical Industry Co., Ltd.) | 140 | 3,3',4,4'-benzophenonetetracarboxylic dianhydride (32.2 g) (0.1 mol; manufactured by Daicel Chemical Industries, Ltd.) | Not observed | 1.5 | 3.3 | 210 |
| Example 22 | 3,3'-diaminodiphenyl sulfone (14.9 g) (0.06 mol; manufactured by Wakayama Seika Kogyo Co., Ltd.) 2,2-bis(3-amino-4-hydroxyphenyl)hexafluoropropane (14.6 g) (0.04 mol; manufactured by AZ Electronic Materials Co., Ltd.) | 130 | 3,3',4,4'-diphenylethertetracarboxylic dianhydride (15.5 g) (0.05 mol; manufactured by MANAC Inc.) Pyromellitic dianhydride (10.9 g) (0.05 mol; manufactured by Daicel Chemical Industries, Ltd.) | Not observed | 1.5 | 3.4 | 210 |
| Example 23 | 3,3'-diaminodiphenyl sulfone (19.9 g) (0.08 mol; manufactured by Wakayama Seika Kogyo Co., Ltd.) 2,2-bis(3-amino-4-hydroxyphenyl)hexafluoropropane (7.32 g) (0.02 mol; manufactured by AZ Electronic Materials Co., Ltd.) | 137 | 3,3',4,4'-diphenylethertetracarboxylic dianhydride (15.5 g) (0.05 mol; manufactured by MANAC Inc.) 3,3',4,4'-benzophenonetetracarboxylic dianhydride (16.1 g) (0.05 mol; manufactured by Daicel Chemical Industries, Ltd.) | Not observed | 1.5 | 3.4 | 210 |

TABLE 2-continued

| | Diamine component | Amount of NMP (g) | Acid dianhydride component | Film whitening | Water absorption ratio (%) | Specific inductive | Glass-transition point (° C.) |
|---|---|---|---|---|---|---|---|
| Example 24 | 3,3'-diaminodiphenyl sulfone (14.9 g) (0.06 mol; manufactured by Wakayama Seika Kogyo Co., Ltd.) 2,2-bis(3-amino-4-hyroxyphenyl)hexafluoropropane (14.6 g) (0.04 mol; manufactured by AZ Electronic Materials Co., Ltd.) | 132 | 3,3',4,4'-benzophenonetetracarboxylic dianhydride (16.1 g) (0.05 mol; manufactured by Daicel Chemical Industries, Ltd.) Pyromellitic dianhydride (10.9 g) (0.05 mol; manufactured by Daicel chemical Industries, Ltd.) | Not observed | 1.5 | 3.5 | 200 |
| Example 25 | 3,3'-diaminodiphenyl sulfone (19.9 g) (0.08 mol; manufactured by Wakayama Seika Kogyo Co., Ltd.) 2,2-bis(3-amino-4-hydroxyphenyl)hexafluoropropane (7.32 g) (0.02 mol; manufactured by AZ Electronic Materials) | 127 | 3,3',4,4'-benzophenonetetracarboxylic dianhydride (16.1 g) (0.05 mol; manufactured by Daicel Chemical Industries, Ltd.) Pyromellitic dianhydride (10.9 g) (0.05 mol; manufactured by Daicel Chemical Industries, Ltd.) | Not observed | 1.5 | 3.5 | 210 |
| Comparative Example 1 | 4,4'-diaminodiphenyl ether (10.0 g) (0.05 mol; manufactured by Wakayama Seika Kogyo Co., Ltd.) 2,2'-bis(trifluoromethyl)-4,4'-diaminobiphenyl (16.0 g) (0.05 mol; manufactured by Wakayama Seika Kogyo Co., Ltd.) | 164 | 2,2-bis(hexafluoroisopropylidene) phthalic anhydride (44.4 g) (0.1 mol; manufactured by Daikin Industries, Ltd.) | Observed | 1 | 2.6 | 170 |
| Comparative Example 3 | 2,2'-bis(trifluoromethyl)-4,4'-diaminobiphenyl (32.0 g) (0.1 mol; manufactured by Wakayama Seika Kogyo Co., Ltd.) | 147 | 3,3',4,4'-diphenylethertetracarboxylic dianhydride (31.0 g) (0.1 mol; manufactured by MANAC Inc.) | Observed | 1 | 2.7 | 190 |

TABLE 3

| | Examples of corresponding polyimide solution | Formation of nonwoven cloth | Fiber diameter (μm) |
|---|---|---|---|
| Example 7 | Example 1 | Good | 6 |
| Example 26 | Example 2 | Good | 3.6 |
| Example 27 | Example 3 | Good | 4 |
| Example 28 | Example 4 | Good | 4 |
| Example 29 | Example 5 | Good | 4 |
| Example 30 | Example 6 | Good | 4 |
| Example 31 | Example 8 | Good | 3.2 |
| Example 32 | Example 9 | Good | 2.8 |
| Example 33 | Example 10 | Good | 2.8 |
| Example 34 | Example 11 | Good | 3.2 |
| Example 35 | Example 12 | Good | 3 |
| Example 36 | Example 13 | Good | 3 |
| Example 37 | Example 14 | Good | 5 |
| Example 38 | Example 15 | Good | 6 |
| Example 39 | Example 16 | Good | 2.6 |
| Example 40 | Example 17 | Good | 2.6 |
| Example 41 | Example 18 | Good | 3.6 |
| Example 42 | Example 19 | Good | 3.2 |
| Example 43 | Example 20 | Good | 2 |
| Example 44 | Example 21 | Good | 2 |
| Example 45 | Example 22 | Good | 1.4 |
| Example 46 | Example 23 | Good | 1.4 |
| Example 47 | Example 24 | Good | 1 |
| Example 48 | Example 25 | Good | 1 |
| Comparative Example 2 | Comparative Example 1 | Bad (whitening) | — |
| Comparative Example 4 | Comparative Example 3 | Bad (whitening) | — |

The invention claimed is:

1. A separator for electric double layer capacitors which comprises a non-woven fabric which is formed from a polyimide solution comprising:
   (a) a resin containing 50 mol% or more, based on the total amount of the resin, of a structural unit represented by the general formula (1); and
   (b) a solvent, wherein

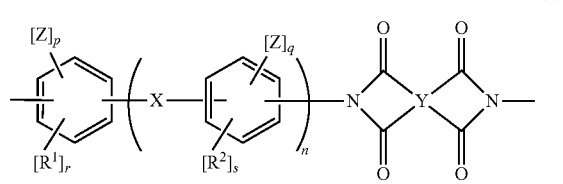

$R^1$ and $R^2$ each independently represent an alkyl group with a carbon number of 1 to 10, a fluoroalkyl group, a cyano group or a nitro group;

Z represents a hydroxyl group or a carboxyl group;

Y represents a tetravalent organic group with a carbon number of 4 to 30;

X represents the following structure,

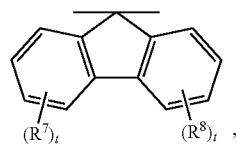

wherein p, q, r and s each represent an integer of 0 to 4, wherein p+q is larger than 1;

n represents an integer of 1;

$R^7$ to $R^8$ each represent an alkyl group with a carbon number of 1 to 4, a fluoroalkyl group or a phenyl group, and may be the same or different; and t represents an integer of 0 to 3.

* * * * *